(12) United States Patent
Boban et al.

(10) Patent No.: US 10,107,411 B2
(45) Date of Patent: Oct. 23, 2018

(54) HYDRAULIC VALVE

(71) Applicant: Hilite Germany GmbH, Marktheidenfeld (DE)

(72) Inventors: Drazen Boban, Nuertingen (DE); Thomas Jacob, Stuttgart (DE); Andreas Knecht, Tuebingen (DE); Oliver Senst, Stuttgart (DE); Daniel Viertler, Bad Urach (DE)

(73) Assignee: Hilite Germany GmbH, Marktheidenfeld (DE)

( * ) Notice: Subject to any disclaimer, the term of this patent is extended or adjusted under 35 U.S.C. 154(b) by 0 days.

(21) Appl. No.: 15/189,175

(22) Filed: Jun. 22, 2016

(65) Prior Publication Data

US 2017/0045154 A1    Feb. 16, 2017

(30) Foreign Application Priority Data

Aug. 13, 2015 (DE) .................. 10 2015 113 331
Mar. 9, 2016 (DE) .................. 10 2016 014 310
May 2, 2016 (DE) .................. 10 2016 108 067

(51) Int. Cl.
F16K 31/06 (2006.01)

(52) U.S. Cl.
CPC ................ F16K 31/0613 (2013.01)

(58) Field of Classification Search
CPC .............. Y10T 137/86622; Y10T 137/8667
USPC ...................... 137/625.65, 625.25
See application file for complete search history.

(56) References Cited

U.S. PATENT DOCUMENTS

| | | | |
|---|---|---|---|
| 6,206,044 B1 * | 3/2001 | Gluf, Jr. ............ | F04B 49/246 137/625.65 |
| 6,488,050 B1 * | 12/2002 | Jabcon ............ | F15B 13/0405 137/625.65 |
| 6,907,901 B2 * | 6/2005 | Holmes ............ | F16D 25/14 137/625.65 |
| 2005/0178451 A1 | 8/2005 | Inami | |
| 2012/0061600 A1 | 3/2012 | Neff et al. | |

FOREIGN PATENT DOCUMENTS

| | | |
|---|---|---|
| DE | 102009001662 | 9/2010 |
| DE | 102011053023 | 2/2013 |
| DE | 102012223430 | 6/2014 |
| EP | 2320114 A1 | 5/2011 |

* cited by examiner

*Primary Examiner* — Eric Keasel
(74) *Attorney, Agent, or Firm* — Von Rohrscheidt Patents

(57) ABSTRACT

A hydraulic valve including a valve bushing; a valve piston that is axially moveable in the valve bushing along a longitudinal axis of the valve bushing; a supply connection configured to feed a hydraulic fluid; at least one operating connection; and at least one tank drain configured to drain the hydraulic fluid, wherein the valve piston is movable by an electromagnetic actuator of the hydraulic valve and the valve bushing forms a hydraulic portion and the actuator forms a magnetic portion of the hydraulic valve, characterized in that a seal element is arranged in the valve bushing which seal element provides a spatial separation of the magnet portion and the hydraulic portion, and wherein the seal element is penetrated by an end of the valve piston configured as a piston plunger.

9 Claims, 3 Drawing Sheets

HYDRAULIC VALVE

RELATED APPLICATIONS

This application claims priority from and incorporates by reference German Patent Applications
DE 10 2015 113 331.8 filed on Aug. 13, 2015,
DE 10 2016 104 310.9 filed on Mar. 9, 2016, and
DE 10 2016 108 067.5 filed on May 2, 2016.

FIELD OF THE INVENTION

The invention relates to a hydraulic valve with a hydraulic portion and a magnet portion, in particular for a mechatronic transmission control of a motor vehicle.

BACKGROUND OF THE INVENTION

In order to still be failsafe after long transmission oil change intervals, in the extreme for so called service lift fillings the transmission valve has to have a high level of robustness. This high level of robustness can be achieved with large clearances for moving parts which, however, degrades control quality.

A hydraulic valve is known from DE 10 2011 053 023 A1 which has a high level of robustness in addition to a high level of control quality. The high level of robustness is achieved in that contaminant particles in the operating medium cannot lead to a seizing of the transmission valve since the armature can impart axial forces that are large enough for the transmission valve to break free under all circumstances. Simultaneously the hydraulic valve has a high level of control quality which is achieved through plural configurative measures. Thus, in particular the transversal forces between the armature and a pole tube are minimized.

A configurative measure for reducing the transversal forces is a very tight running tolerance between the armature and the pole tube which is achieved by a very thin separation layer instead of for example a sleeve or a thick coating. A very thin separation layer of this type is advantageously provided with a layer thickness of 10 μm to 60 μm. The thin separation layer can be achieved for example chemically or through a galvanic process. For example chemical nickel plating can be used for this chemical method. Thus, a layer thickness of 45 μm has proven ideal. The minimum thickness of 10 μm can be implemented at least theoretically. The methods currently used facilitates producing a layer thickness of 20 μm or greater. Contrary to for example galvanic nickel plating the chemical method does not use any electrical voltage that is applied through electrodes. The layer thickness achieved through chemical nickel plating is very homogenous.

BRIEF SUMMARY OF THE INVENTION

Thus, it is an object of the invention to provide an improved hydraulic valve which combines a very high level of robustness with a cost effective configuration.

The object is achieved by a hydraulic valve including a valve bushing; a valve piston that is axially moveable in the valve bushing along a longitudinal axis of the valve bushing; a supply connection configured to feed a hydraulic fluid; at least one operating connection, and at least one tank drain configured to drain the hydraulic fluid, wherein the valve piston is movable by an electromagnetic actuator of the hydraulic valve and the valve bushing forms a hydraulic portion and the actuator forms a magnetic portion of the hydraulic valve, characterized in that a seal element is arranged in the valve bushing which seal element provides a spatial separation of the magnet portion and the hydraulic portion, and wherein the seal element is penetrated by an end of the valve piston configured as a piston plunger.

Advantageous embodiments and advantages of the invention can be derived from the dependent claims, the description and the drawing figures.

A hydraulic valve is proposed that includes a valve bushing and a valve piston that is axially moveable in the valve bushing along a longitudinal axis of the valve bushing. The hydraulic valve furthermore includes a supply connection for feeding a hydraulic fluid, at least one operating connection and at least one tank drain for draining the hydraulic fluid, wherein the valve piston is movable by an electromagnetic actuator of the hydraulic valve and the valve bushing forms a hydraulic portion and the actuator forms a magnet portion of the hydraulic valve.

In order to assure the function of hydraulic valves in mechatronic transmission controls it is necessary as a matter of principle to provide the bearings of magnets as robust as possible against an impact of external influences. Thus, in addition to obtaining mechanical robustness a robustness against contaminated operating media is of essential importance. In particular large particles can lead to an impairment of the magnet function and the valve function and thus to an impairment of the magnet function and/or the hydraulic function up to a failure through blocking due to the small operating clearances and running clearances. A direct connection of the magnetic and hydraulic portions, this means of the magnet portion and the hydraulic portion of the hydraulic valve facilitates an exchange of the contaminated medium.

According to the invention the valve bushing includes a seal element for spatial separation of the magnet portion and the hydraulic portion wherein the seal element is penetrated by an end of the valve piston that is configured as a piston plunger.

Through the spatial separation of magnet portion and the hydraulic portion of the hydraulic valve an exchange of contaminant particles between the magnet portion and the hydraulic portion of the hydraulic valve, wherein the contaminant particles impair the magnet function and/or the hydraulic function, can be significantly reduced. In particular a negative influence upon the armature movement in the pole tube and a magnet/valve—hysteresis thus induced can be prevented.

Furthermore the seal element helps to significantly reduce an exchange volume between the magnet portion and the hydraulic portion of the hydraulic valve through a reduction of the piston plunger volume that is arranged in the magnet portion.

Thus simple and cost effective remedies increase overall robustness and service life of the hydraulic valve due to a reduced contaminant introduction into the magnet portion. Thus, the magnetic transversal forces in the portion of the piston plunger and thus the valve hysteresis can be significantly reduced.

Advantageously the seal element is provided pressed into an end section of the valve bushing, wherein the end section is at least partially received by the actuator. Thus, the impressing process is a cost effective and simple method to establish a seal between the valve portion and the magnet portion of the hydraulic valve.

According to an advantageous embodiment of the invention the seal element is configured as a disc that is U-shaped in a cross sectional view and which includes an inner arm and an outer arm and which can be advantageously configured as a cost effective deep drawn component. Advantageously the piston plunger penetrates the inner arm of the seal element without contacting it so that a seal between the seal element and the piston plunger is configured as a gap seal. Thus, an exchange of the hydraulic fluid can be reduced to a minimum in a simple manner through a ratio of seal length to seal height of the seal gap.

Another advantageous embodiment provides that the seal element is essentially configured cylindrical and includes a bore hole which is penetrated by the piston plunger without physical contact so that a seal between the seal element and the piston plunger is configured as a gap seal. Thus, the seal element is advantageously configured as a turned component and includes diameter increases in order to seal relative to the valve bushing, wherein the diameter increases contact the valve bushing with a press fit in a sealing manner after being pressed into the end section of the valve bushing.

BRIEF DESCRIPTION OF THE DRAWINGS

Further detail can be derived from the subsequent drawing description. The drawings illustrate embodiments of the invention. The drawings, the description and the patent claims include numerous features in combination. A person skilled in the art will view the features individually and will combine them into useful additional combinations.

DETAILED DESCRIPTION OF THE INVENTION

Figure 1:
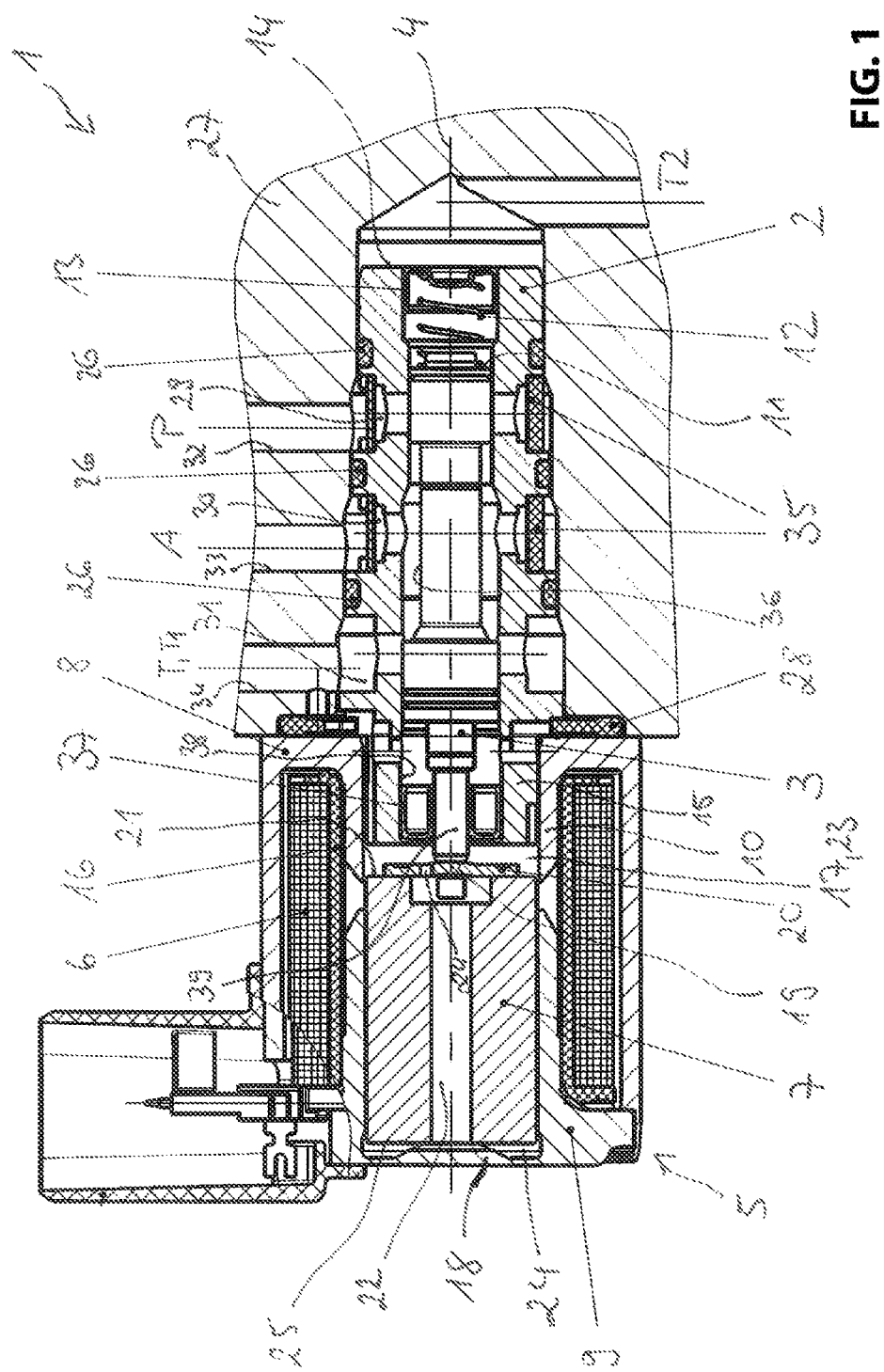
FIG. 1 illustrates a sectional view of a hydraulic valve according to an embodiment of the invention in a starting position without electrical current loading.

In the drawing figures identical or equivalent components are designated with identical reference numerals. The figures merely illustrate advantageous embodiments and do not limit the scope and spirit of the invention.

FIG. 1 illustrates a longitudinal sectional view of a hydraulic valve 1 according to an embodiment of the invention. The hydraulic valve 1 is configured as a proportional valve and is used for example in an automatic transmission.

The hydraulic valve includes a valve bushing 2 and a valve piston 3 that is axially moveable in a bore hole 35 of the valve busing 2 along a longitudinal axis 4 of the valve bushing 2 wherein the bore hole includes shoulders. The valve piston 3 is movable by an electromagnetic actuator of the hydraulic valve 1. The actuator 5 which represents the magnet potion of the hydraulic valve 1 includes an armature 7 that is operatively connected with the valve piston 3, wherein the armature is coaxially arranged relative to the valve bushing 2. Furthermore the armature 7 is movably received in a housing 8 of the actuator 5 by the magnet coil 6 including the armature 7, wherein the armature 7 is moveably arranged in a pole tube 9 and a pole core 10.

Loading the magnet coil 6 with current causes an axial movement of the valve piston 3, wherein a retaining element 12 arranged at a face of the valve piston 3 that is oriented away from the actuator 5 imparts a retaining force upon the valve piston 3, wherein the valve piston has to be moved against the retaining force. The retaining element configured in this case as a compression coil spring is supported at a cover 13 which is arranged in the valve busing 2 with a press fit in a portion of a housing face 14 that is oriented away from the actuator 5.

The magnet coil is received in the housing 8 and defined by a coil carrier on a radial inside, wherein the housing 8 is integrally configured in one piece with the pole core 10 which is arranged opposite to the pole tube 9. The cylindrical pole core 10 is oriented towards the valve bushing 2 and arranged so that it envelops an end portion 15 of the valve bushing 2. The cylindrical pole tube 9 includes a wall 18 at an end oriented away from the pole core 10 wherein the wail defines an armature cavity 17.

The non-conductive coil carrier 16 in which a coil winding of the magnet coil 6 is received includes a U-shaped profile and is placed onto the pole tube 9 and the pole core 10. The pole tube 9 and the pole core 10 can be integrally configured in one piece according to an embodiment illustrated in FIG. 3 and they can be provided connected by very thin connecting bar wherein the pole core 10 and the housing 8 are configured as separate components in this case.

During operations the magnet coil 6 is excited and generates a magnetic field which magnetizes the pole core 10, the armature 7, the pole tube 9 and the housing 8. The end section 15 enveloped by the pole core 10 is also impacted by the magnetic field.

A piston plunger 39 arranged at an end of the valve piston 3 thus contacts an anti-stick element 20 with a face 19 oriented towards the armature 7, wherein the anti-stick element 20 is arranged at a first face 21 of the armature 7 that is oriented towards the face 19. Thus the valve piston 3 is operatively connected with the armature 7 and an axial movement of the armature 7 is transferrable to the valve piston 3. The anti-stick element 20 is configured disc shaped and used for preventing an adherence of the armature 7 at the magnetically conductive valve bushing 2. Furthermore the anti-stick element 20 substantially closes a flowable armature channel 22 which is configured as a central bore hole that extends along the longitudinal axis 4 in the armature 7.

In the illustrated position of the hydraulic valve 1 an annular first cavity 23 is configured between the armature 7 and the valve bushing 2. The first cavity 23 is connected in a flowable manner with an annular second cavity 24 through at least one opening 24 through the armature channel 12 introduced into the anti-stick element 20 and completely penetrating the anti-stick element 20 in the direction of the longitudinal axis 4, wherein the second cavity 24 is arranged between a second face 25 of the armature 7 oriented away from the first face 21 and the wail 18 of the pole tube 9. This means that a pressure balancing between the cavities 23 and 24 can be provided any time. Thus, the armature 7 only has to provide a linear movement due to the valve piston 3 during a linear movement of the valve piston 3 in a direction oriented away from the actuator 5 and has a quick reaction time for adjusting the valve piston 3.

The valve bushing 2 is arranged in a sealing manner for example in a transmission component 27 using seal elements 26, 28 and includes a supply connection P for feeding the hydraulic fluid, at least one operating connection A and at least one tank connection T for draining the hydraulic fluid. The supply connection P, the operating connection A and the tank drain T are associated in the valve busing 2 with a first annular groove 29, a second annular groove 30 or a third annular groove 31 which are respectively connected with the connections of the transmission component through connecting channels 32, 33, 34. Two additional tank connections T1 and T2 for leakage are provided in the transmission component 27, wherein the tank connections T and T1 lead into a common connecting channel of the transmission component 27.

The supply connection P is configured to connect with an oil pump that is not illustrated in more detail so that the hydraulic valve 1 is supplyable with the hydraulic fluid which is oil in this embodiment. The first ring groove 29 and the second ring groove 30 respectively include a screen 35 for filtering the hydraulic fluid.

The valve piston 3 includes a circumferential ring groove 36. Depending on a positioning of the valve piston 3 either the operating connection A is connected with the tank connection T as illustrated or the supply connection P is connected with the operating connection A in a flowable manner.

A seal element 37 configured as a disc with a U-shaped cross section that is for example deep drawn is used to provide a spatial separation of the magnet portion and the hydraulic portion of the hydraulic valve 1 and is arranged in the end section 15 of the valve bushing 2. Advantageously the seal element 37 which is illustrated in FIG. 2 in a blown up view is pressed into the bore hole 38.

It is evident that the piston plunger 39 penetrates an inner arm 40 of the seal element 37 without contacting it, so that a gap that is created between the piston plunger 39 and the arm 40 acts as a seal gap and thus as a gap seal wherein a ratio of seal length to depth height of the seal gap can reduce an exchange of the hydraulic fluid to a minimum.

Thus an exchange of contaminant particles which impair the magnetic and/or hydraulic functions can be significantly reduced between the magnet portion and the hydraulic portion of the hydraulic valve 1. In particular a negative influence upon an armature movement in the pole tube 9 and the magnet/valve—hysteresis caused thereby can be prevented.

Figure 2:
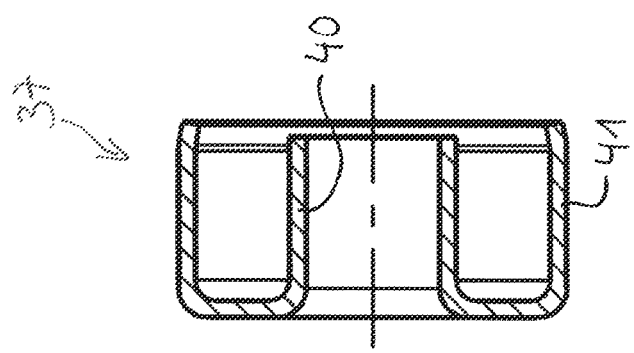
FIG. 2 illustrates an blown up sectional view of a seal element of the hydraulic valve according FIG. 1.

As can be derived in particular from FIG. 2 the outer arm 41 is provided bent radially inward at its free end in order to facilitate the mounting, this means impressing the seal element 37.

Thus, the seal element 37 facilitates significantly reducing an exchange volume between the magnet portion and the hydraulic portion of the hydraulic valve 1 through a reduction of a piston plunger volume arranged in the magnet portion.

Thus, an overall robustness and service life of the hydraulic valve 1 is increased due to reduced contaminant introduction into the magnet portion.

Thus, the magnetic transversal forces in the portion of the piston plunger 39 and thus the valve hysteresis can be reduced.

Figure 3:
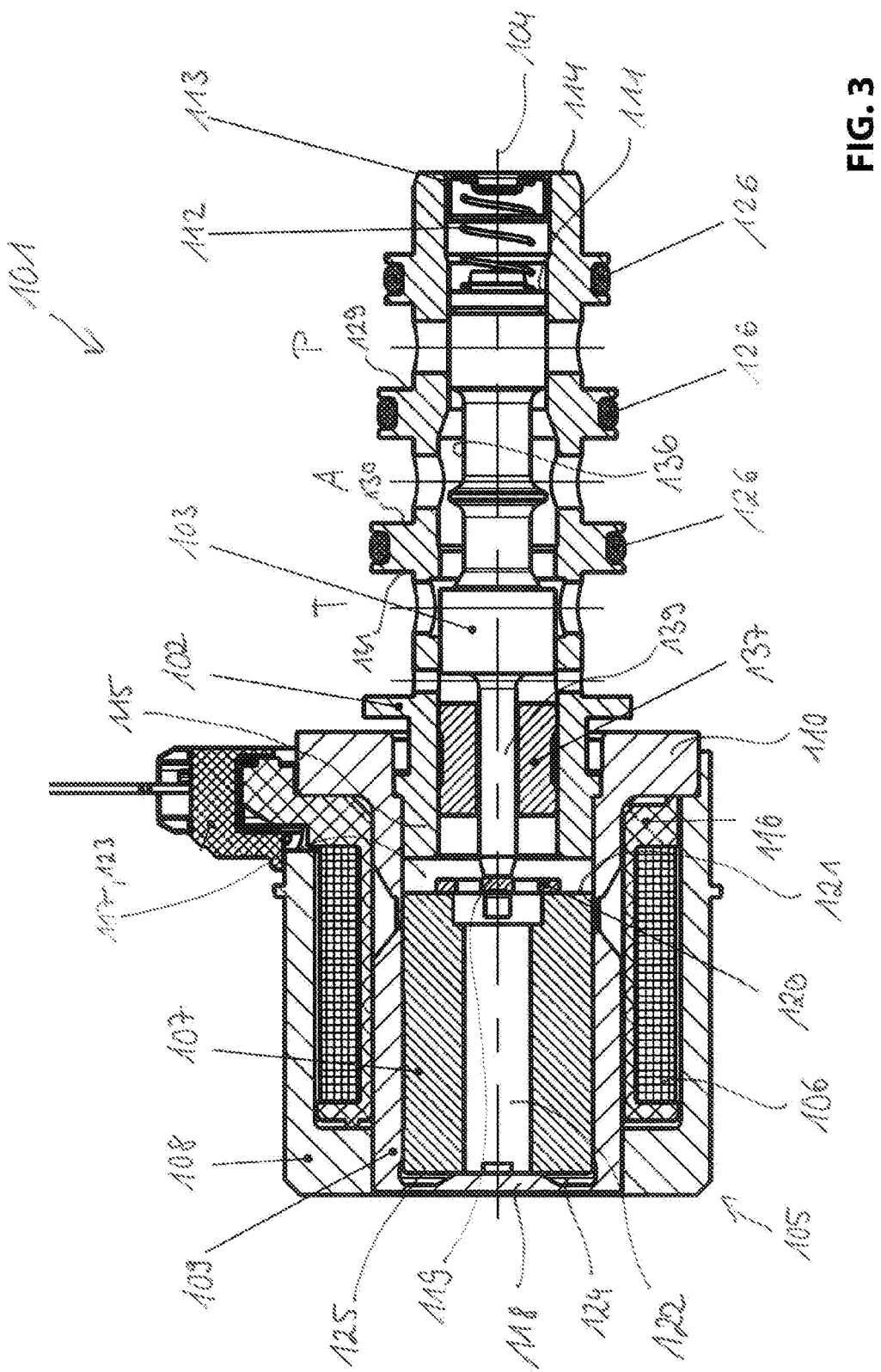
FIG. 3 illustrates a sectional view of a hydraulic valve according to a second embodiment of the invention in a starting position without current loading.

FIG. 3 illustrates a longitudinal sectional view through a hydraulic valve 101 according to another embodiment of the invention wherein the hydraulic valve is also configured as a proportional pressure reduction valve.

Identical or like components are provided with reference numerals that are increased by 101 compared to the first embodiment so that repeating the description can be omitted.

Figure 4:
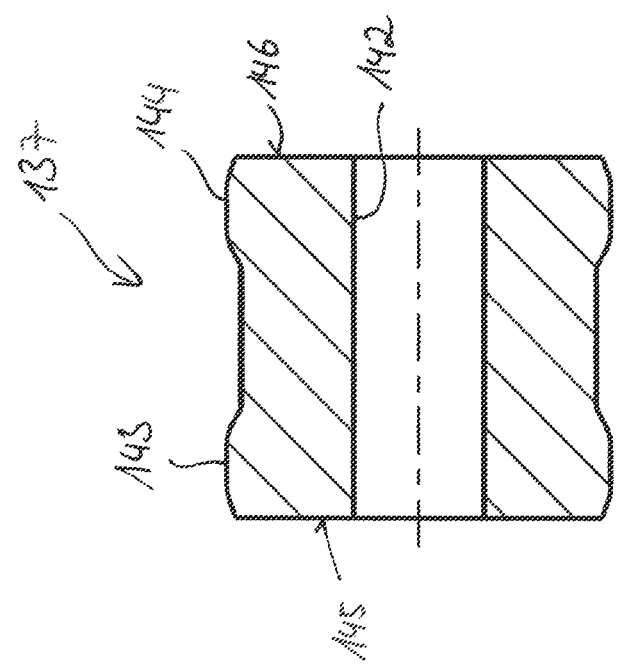
FIG. 4 illustrates an enlarged sectional view of a seal element of the hydraulic valve according to FIG. 3.

The hydraulic valve 101, differently from the first embodiment, includes a seal element 137 that is illustrated in FIG. 4 in a blown up view, wherein the seal element is essentially configured cylindrical. The piston plunger 139 penetrates a central bore hole 142 of the seal element 137 without touching wherein the seal element can be configured for example as a turned component. The gap thus created between the seal element 137 and the piston plunger 139 advantageously functions as a gap seal.

Sealing the seal element 137 relative to the valve bushing 102 is performed by diameter enlargements 133, 144 in a portion of the faces 145, 146 which contact the valve bushing 102 through a press fit in a sealing manner after being pressed into the end portion 115 of the valve bushing 102. The diameter expansions 143, 144 are flattened on both sides in order to simplify pressing the sealing element 137 in.

What is claimed is:

1. A hydraulic valve, comprising:
a valve bushing;
a valve piston that is axially moveable in the valve bushing along a longitudinal axis of the valve bushing;
a supply connection configured to feed a hydraulic fluid;
at least one operating connection; and
at least one tank drain configured to drain the hydraulic fluid,
wherein the valve piston is axially movable by an electromagnetic actuator of the hydraulic valve to flow connect the operating connection either with the tank connection or with the supply connection and the valve bushing forms a hydraulic portion and the actuator forms a magnetic portion of the hydraulic valve,
wherein a seal element is arranged in the valve bushing which seal element provides a spatial separation of the magnet portion and the hydraulic portion, and
wherein the seal element is penetrated by an end of the valve piston configured as a piston plunger.

2. The hydraulic valve according to claim 1, wherein the seal element is pressed into an end section of the valve bushing, wherein the end section is at least partially received by the actuator.

3. The hydraulic valve according to claim 2, wherein the seal element is provided as a disc with a U-shaped cross section which includes an inner arm and an outer arm.

4. The hydraulic valve according to claim 3, wherein the seal element is provided as a deep drawn component.

5. The hydraulic valve according to claim 3, wherein the piston plunger penetrates the inner arm of the seal element without contacting it so that a seal between the seal element and the piston plunger is configured as a gap seal.

6. The hydraulic valve according to claim 2, wherein the seal element is essentially configured cylindrical and includes a bore hole which is penetrated by the piston plunger without contacting the bore hole so that a seal between the seal element and the piston plunger is configured as a gap seal.

7. The hydraulic valve according to claim 6, wherein the seal element is configured as a turned component.

8. The hydraulic valve according to claim 6,
wherein the seal element includes diameter enlargements that are configured to provide a seal relative to the valve bushing, and
wherein the diameter enlargements contact the valve bushing with a press fit after the seal element is pressed into an end section of the valve bushing.

9. The hydraulic valve according to claim 2, wherein the seal element is penetrated contactless by the end of the valve piston configured as the piston plunger.

* * * * *